United States Patent [19]

Hornung et al.

[11] Patent Number: 5,641,236
[45] Date of Patent: Jun. 24, 1997

[54] COUPLING FOR JOINING TUBES

[75] Inventors: Andreas Hornung, Kamen; Karl-Heinz Schräder, Fröndenberg, both of Germany

[73] Assignee: Karl-Heinz Schrader, Kamen, Germany

[21] Appl. No.: 419,029

[22] Filed: Apr. 10, 1995

[30] Foreign Application Priority Data

Apr. 13, 1994 [DE] Germany .............................. 9406130 U

[51] Int. Cl.⁶ .................................................. F16D 1/00
[52] U.S. Cl. ................. 403/171; 256/59; 256/65; 256/67; 403/64; 403/114; 403/300
[58] Field of Search ..................... 256/59, 65, 67, 256/68, 69, 70; 403/6, 7, 8, 64, 76, 77, 84, 86, 90, 112, 113, 114, 115, 171, 174, 300, 306

[56] References Cited

U.S. PATENT DOCUMENTS

| | | | |
|---|---|---|---|
| 695,022 | 3/1902 | Albertson | 403/86 X |
| 961,981 | 6/1910 | Miller | 403/174 |
| 1,136,811 | 4/1915 | Kasanszky et al. | 403/8 |
| 1,304,561 | 5/1919 | Gulesian | 403/84 |
| 1,316,155 | 9/1919 | Harrison et al. | 403/174 X |
| 1,467,153 | 9/1923 | Gulesian | 403/64 |
| 1,663,203 | 3/1928 | Luipersbek | 403/77 |
| 2,694,538 | 11/1954 | Consolo et al. | 403/76 X |
| 2,841,427 | 7/1958 | Sheppard | 403/76 X |
| 2,922,653 | 1/1960 | O'Brien | 403/171 X |
| 3,055,341 | 9/1962 | Riepe | 403/77 X |
| 4,150,907 | 4/1979 | Thurnauer | 256/67 X |
| 5,096,324 | 3/1992 | Harley | 403/8 |
| 5,437,433 | 8/1995 | Rezek | 256/59 X |
| 5,556,218 | 9/1996 | Homer | 403/171 X |

FOREIGN PATENT DOCUMENTS

| | | | |
|---|---|---|---|
| 2653837 | 5/1991 | France | 403/171 |
| 2670229 | 6/1992 | France | 256/59 |
| 1115440 | 10/1961 | Germany . | |
| 7216103 | 7/1972 | Germany . | |
| 2736635 | 10/1978 | Germany | 403/171 |
| 4104581 | 8/1982 | Germany . | |
| 3627336 | 2/1988 | Germany . | |
| 3914420 | 11/1990 | Germany . | |
| 4009371 | 9/1991 | Germany . | |
| 9113841 | 3/1992 | Germany . | |
| 136625 | 12/1919 | United Kingdom | 403/174 |
| 664988 | 1/1952 | United Kingdom | 403/76 |
| 2202249 | 9/1988 | United Kingdom . | |
| 2223289 | 4/1990 | United Kingdom | 403/171 |

Primary Examiner—Kenneth J. Dorner
Assistant Examiner—Andrea Chop
Attorney, Agent, or Firm—Herbert Dubno; Andrew Wilford

[57] ABSTRACT

A coupling for joining a pair of tubes having ends has a ball having a substantially spherical outer surface and a center and formed with an outwardly projecting pin extending along an axis radial of the ball and center. The pin is dimensioned to fit snugly into the end of one of the tubes. Another pin dimensioned to fit snugly into the end of the other of the tubes has a seat shaped to complementarily fit against the surface of the ball. The other pin is secured to the surface the ball at any of a multiplicity of angular offset positions thereon. A threaded bore is formed in the ball and centered on a bore axis traversing the center and another bore is formed in the other pin, opening into the seat, and centered on a bore axis extending at an acute angle to the respective pin. A screw extends through the bore of the other pin and is seated in the threaded bore of the ball. Normally the bore axis of the threaded bore extends at an acute angle to the axis of the pin of the ball.

10 Claims, 4 Drawing Sheets

COUPLING FOR JOINING TUBES

FIELD OF THE INVENTION

The present invention relates to a coupling for joining tubes. More particularly this invention concerns such a coupling used for making up handrails and the like.

BACKGROUND OF THE INVENTION

In order to join two tubes when the tubes are not coaxial it is necessary to either use a special coupling or to bend the tubes. Couplings are standard that allow joints to be made at different standardized angles, typically 30°, 45°, 60°, 90°, and 180°, but when intermediate angles must be made the installer is normally forced to bend the tubes or make up a special coupling.

In German patent document 3,914,420 filed May 1, 1989 by A. W. Sommer the coupling ball is hollow and is formed with an array of holes. Spreadable pins are inserted into the tube ends and then into the appropriate holes and the unused holes are capped. This arrangement provides a wide range of positions, but still does not accommodate intermediate angular settings. In addition the capped holes are obvious and are often considered ugly.

German patent document 4,336,401 describes a system where two part-spherical parts are joined together at a diametral plane and each have a mounting pin that is fitted into a respective tube end. When the two tubes are coaxial the diametral plane forms an acute angle to the axis. Thus when an angle needs to be formed, the two coupling parts can be rotated relative to each other so their pins are not coaxial but instead their axes meet at a center of the sphere formed by the two parts. Such a system does indeed allow many angles to be accommodated, but has the disadvantage that the joint in the coupling ball is visible. Furthermore it is fairly difficult to join the two parts together in a manner where the attachment means is not visible.

OBJECTS OF THE INVENTION

It is therefore an object of the present invention to provide an improved coupling for joining two tubes.

Another object is the provision of such an improved coupling for joining two tubes which overcomes the above-given disadvantages, that is which allows the two tubes to be joined at any angle over a wide range, while the ball in the coupling has a smooth and uninterrupted outer surface except where the tubes are joined to it.

SUMMARY OF THE INVENTION

A coupling for joining a pair of tubes having ends has according to the invention a ball having a substantially spherical outer surface and a center and formed with an outwardly projecting pin extending along an axis radial of the ball and center. The pin is dimensioned to fit snugly into the end of one of the tubes. Another pin dimensioned to fit snugly into the end of the other of the tubes has a seat shaped to complementarily fit against the surface of the ball. The other pin is secured to the surface the ball at any of a multiplicity of angular offset positions thereon. According to the invention a threaded bore is formed in the ball and centered on a bore axis traversing the center and another bore is formed in the other pin, opening into the seat, and centered on a bore axis extending at an acute angle to the respective pin. A screw extends through the bore of the other pin and is seated in the threaded bore of the ball. Normally the bore axis of the threaded bore extends at an acute angle to the axis of the pin of the ball.

Thus with this system it is possible to achieve any offset from 0° to twice that angular offset between the bore and axis of the other pin. The other pin is a simple screw clamped to the ball in the desired location. The joint is very smooth and in fact once the other pin is fixed in place it is virtually impossible to tell which of the pins is part of the ball and which is just attached to it. The exposed surface of the ball is smooth and uninterrupted.

The other pin according to the invention is formed in the seat with a counterbore and the bore of the other pin can be elongated as a slot and open into the counterbore. The seat has a part-spherical surface that is of the same radius of curvature as an outer surface of the ball. In another arrangement the other pin is formed with a counterbore in line with the respective bore and opening away from the ball. When the other pin has a part-spherical rear-end surface whose center of curvature lies at the center of the ball when the other pin is mounted on the ball, the screw head will bear against this rear-end surface for excellent and very solid clamping of the other pin to the ball.

Each of the pins is formed with a radially outwardly projecting collar. In addition each collar is of an outside diameter equal to an outside diameter of the respective tube. It is also possible for the other pin to have a frustoconically tapered end portion formed with the seat and tapering toward the ball.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION

Figure 1:
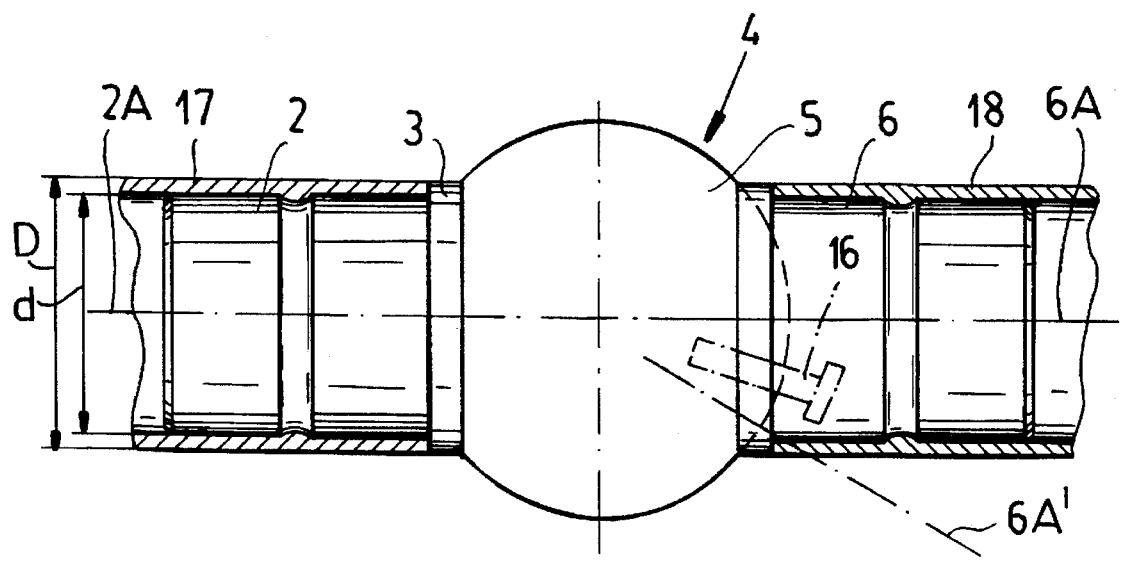
FIG. 1 is a partly sectional side view of a coupling and tubes according to this invention.
Figure 2:
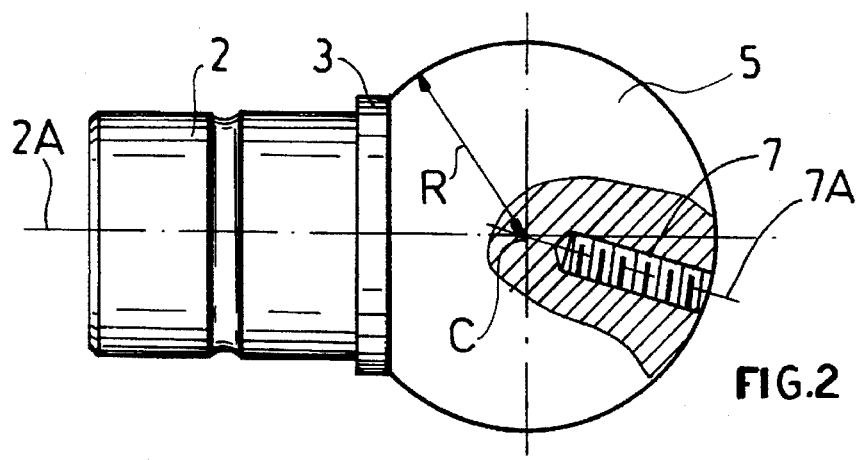
FIG. 2 is a partly sectional side view of the ball part of the FIG. 1 coupling.
Figure 3:
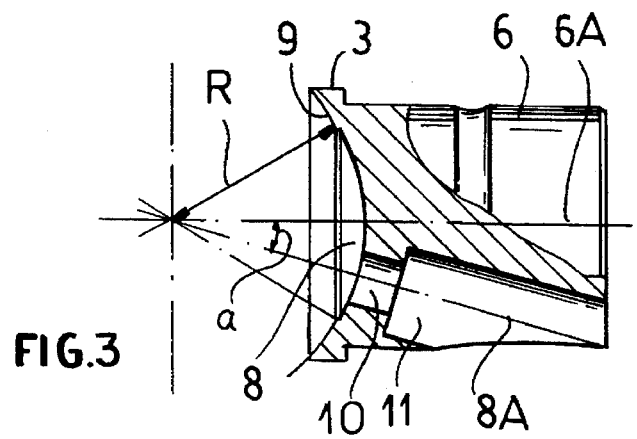
FIG. 3 is a partly sectional side view of the pin part of the FIG. 1 coupling.

As seen in FIGS. 1 through 3 a pair of cylindrical metal tubes 17 and 18 of outside diameter D and inside diameter d are joined together at a coupling 4 comprised of a central ball part 5 having a pin 2, and a pin part 6. The ball 5 has a spherical outside surface of a radius of curvature R measured to a center C of the ball 5 and is integrally formed with the pin 2 which has an outside diameter equal to the inside tube diameter d. A short collar or enlarged cylindrical portion 3 of the pin 2 joins it to the ball 5 and is of the same outside diameter D as the tubes 17 and 18. The pin 2 is centered on an axis 2A that traverses the center C of the ball 5.

The pin part 6 is also formed with a collar 3 identical to that of the ball 5 and is externally of the same diameter and size as the pin 2. It is centered on an axis 6A and has a seat 8 with an outer edge strip 9 that has the same radius R of curvature as the outer surface of the ball 5. In addition this part 6 is formed with a bore 10 opening into the seat 8 and extending along an axis 8A that forms an angle a of about 15° with the axis 6A and that has a counterbore 11 that opens on a side wall of the pin part 6.

The ball 5 is formed with a threaded bore 7 that extends at the angle a to the axis 2A and that is centered on an axis 7A traversing the center C. When a screw 16 is threaded through the bore 10 into the bore 7 it is therefore possible as shown in FIG. 1 for the two axes 2A and 6A to be coaxial. Alternately the pin part 6 can be pivoted about the axis 7A to give it an offset varying from 0° to 30° and steplessly variable therebetween. In FIG. 1 line 6A' indicates the position of the axis 6A at maximum angular offset. If the angle a were greater, a larger offset would be possible.

Figure 5:
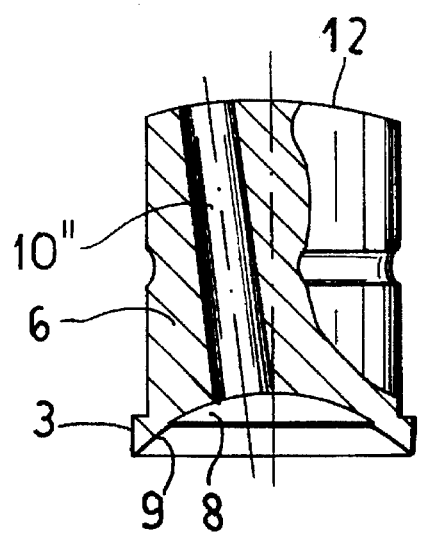
Figure 4:
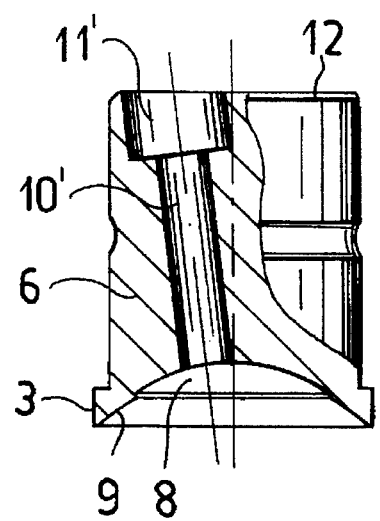

In FIG. 4 the pin part 6 is formed with a bore 10' and counterbore 11' similar to that of FIGS. 1–3, but opening at a rear end face 12 of the part 6. This end face 12 is of such a radius of curvature that when the pin part 6 is mounted on a ball part 5 the center of curvature of the surface 12 lies at the center C. In FIG. 5 the bore 10" is angled as in FIG. 4, but has no counterbore.

Figure 6:
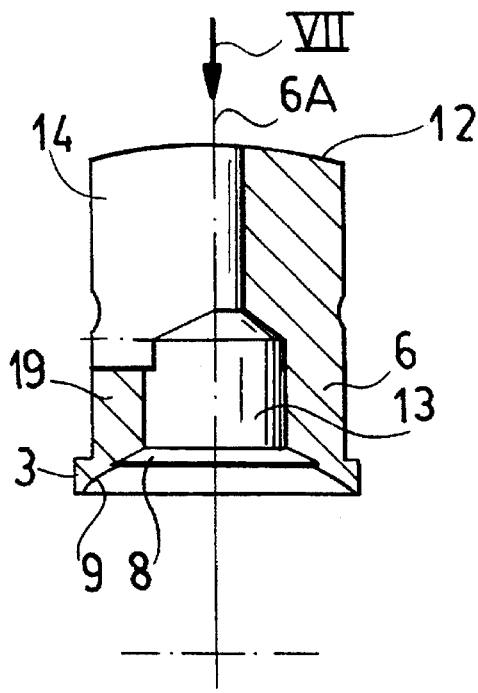
FIGS. 4, 5, and 6 are views like FIG. 3 of other pin parts according to the invention.
Figure 7:
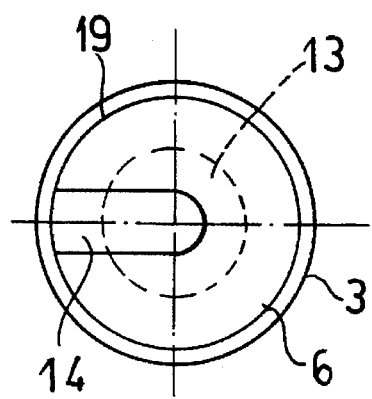
FIG. 7 is an end view taken in the direction of arrow VII of FIG. 6.

FIGS. 6 and 7 show an arrangement where the part 6 is formed with a large-diameter counterbore 13 opening into the seat and centered on the axis 6A. Here a slot 14 is formed in the part 6 that opens both axially at the rear face 12 and at a side surface 19 of the part 6. In this arrangement the angle of the part 6 can be set without rotating it, which can be handy in complex setups.

Figure 8:
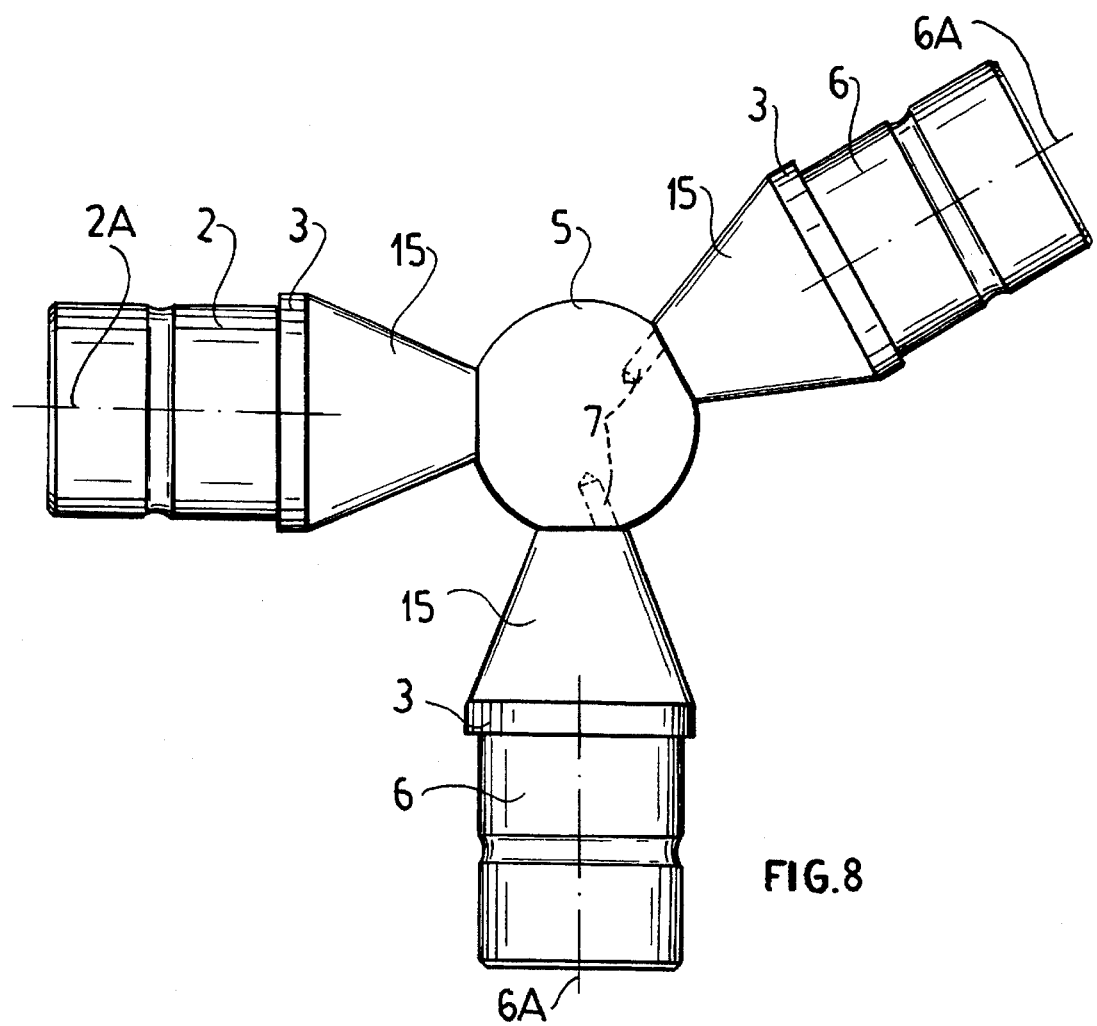
FIG. 8 is a plan view of another coupling assembly according to the invention.
Figure 9:
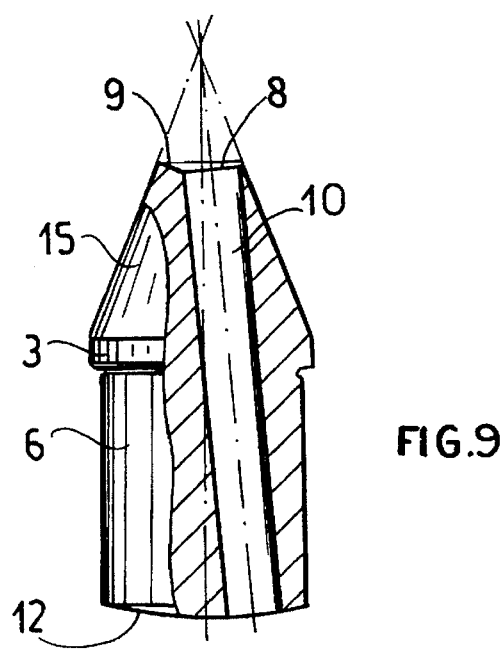
FIG. 9 is a partly sectional side view of the coupling of FIG. 8.

In FIGS. 8 and 9 the ball part 5 is formed with a plurality, here two, of bores 7 to each of which is secured a respective pin part 6. The pin parts 6, and even the pin 2, have frustoconical end portions 15 that are centered on the respective axes 2A and 6A and that taper inward toward the ball 5. The ends of these tapered portions 15 are formed with the seats 8 having the surfaces 9 of the same radius of curvature as the ball 5. Here as in FIG. 5 the parts 6 are formed with angled attachment bores 10 that open at the rear ends 12.

Figure 10:
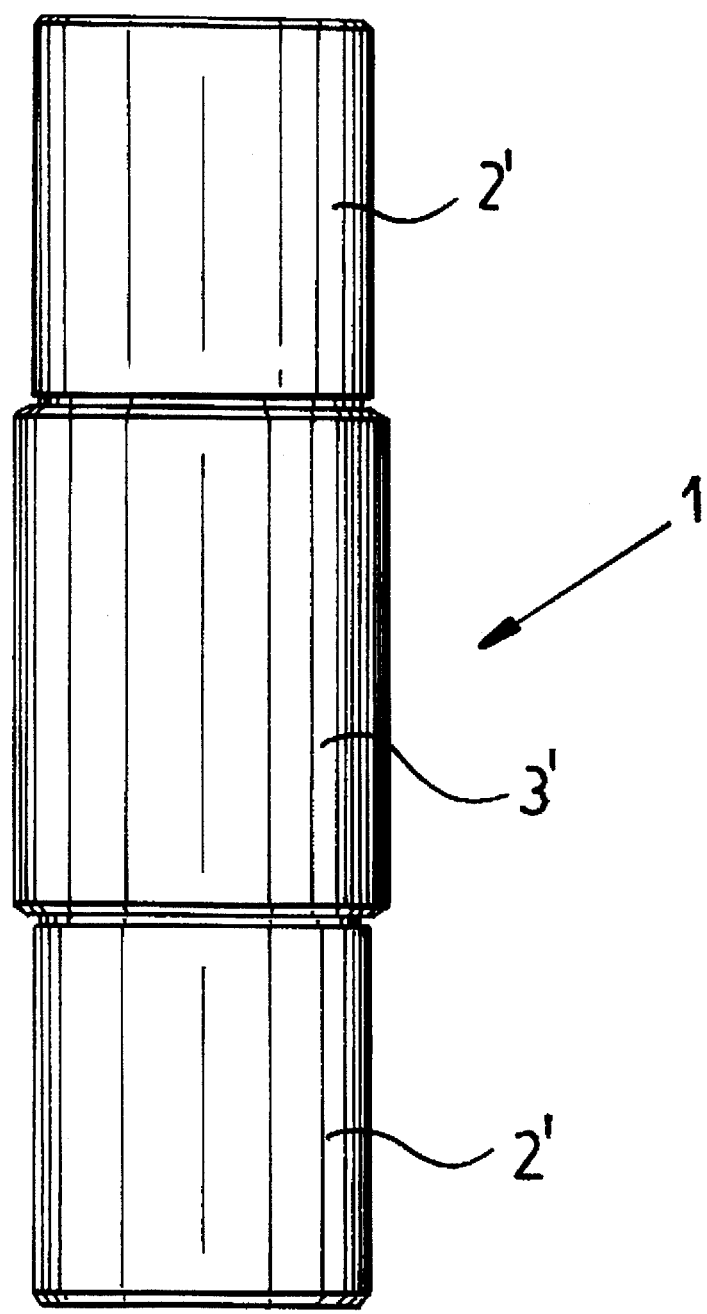
FIG. 10 is a side view of another coupling.

FIG. 10 shows a simple coupling 1 for splicing together two coaxial tubes and having a pair of cylindrical pins 2' of outside diameters equal to the diameter d and a central coaxial portion 3' of an outside diameter equal to the diameter D.

We claim:

1. In combination with a pair of tubes having ends, a coupling comprising:
   a ball having a substantially spherical outer surface and a center and formed with an outwardly projecting pin extending along an axis radial of the ball and center, the ball having a threaded bore centered on a bore axis traversing the center, the pin being dimensioned to fit snugly into the end of one of the tubes;
   another pin dimensioned to fit snugly into the end of the other of the tubes, having a seat shaped to complementarily fit against the surface of the ball, and formed with a bore opening into the seat and centered on a bore axis extending at an acute angle to the longitudinal axis of the other pin; and
   means including a screw extending through the bore of the other pin and seated in the threaded bore of the ball for securing the other pin to the surface of the ball at any of a multiplicity of angularly offset positions thereon.

2. The coupling defined in claim 1 wherein the bore axis of the threaded bore extends at an acute angle to the axis of the pin of the ball and the bore of the other pin is substantially cylindrical and centered on the bore axis of the other pin.

3. The coupling defined in claim 1 wherein the other pin is formed in the seat with a counterbore and the bore of the other pin is elongated as a slot and opens into the counterbore.

4. The coupling defined in claim 1 wherein the seat has a part-spherical surface that is of the same radius of curvature as an outer surface of the ball.

5. The coupling defined in claim 1 wherein the other pin is formed with a counterbore in line with the bore of the other pin and opening away from the ball.

6. The coupling defined in claim 1 wherein the other pin has a part-spherical rear-end surface whose center of curvature lies at the center of the ball when the other pin is mounted on the ball.

7. The coupling defined in claim 1 wherein each of the pins is formed with a radially outwardly projecting collar.

8. The coupling defined in claim 7 wherein each collar is of an outside diameter equal to an outside diameter of the respective tube.

9. The coupling defined in claim 1 wherein the other pin has a frustoconically tapered end portion formed with the seat and tapering toward the ball.

10. In combination with a pair of tubes having ends, a coupling comprising:
    a ball having a substantially spherical outer surface and a center and formed with
        an outwardly projecting pin extending along an axis radial of the center and dimensioned to fit snugly into the end of one of the tubes, and
        a threaded bore formed in the ball and centered on a bore axis traversing the center and forming an acute angle with the pin axis;
    another pin dimensioned to fit snugly into the end of the other of the tubes and formed with
        a seat having a part-spherical portion shaped to complementarily fit against the surface of the ball and
        a bore opening into the seat and centered on a bore axis extending at an acute angle to the longitudinal axis of the other pin; and
    a screw extending through the bore of the other pin, seated in the threaded bore of the ball, and bearing radially toward the center on the other pin, the bore of the other pin snugly surrounding the screw.

* * * * *